United States Patent
Cao et al.

(10) Patent No.: US 11,171,734 B2
(45) Date of Patent: Nov. 9, 2021

(54) SPREADING CODE SEQUENCES FOR REFERENCE SIGNALS

(71) Applicant: ZTE Corporation, Guangdong (CN)

(72) Inventors: Wei Cao, Guangdong (CN); Li Tian, Guangdong (CN); Yifei Yuan, Guangdong (CN); Tao Lu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 16/908,609

(22) Filed: Jun. 22, 2020

(65) Prior Publication Data

US 2020/0322079 A1 Oct. 8, 2020

Related U.S. Application Data

(63) Continuation of application No. PCT/CN2017/118059, filed on Dec. 22, 2017.

(51) Int. Cl.
*H04J 13/00* (2011.01)
*H04J 13/14* (2011.01)
(Continued)

(52) U.S. Cl.
CPC .......... *H04J 13/0062* (2013.01); *H04J 13/14* (2013.01); *H04J 13/22* (2013.01); *H04L 1/1812* (2013.01);
(Continued)

(58) Field of Classification Search
CPC .... H04J 13/10; H04J 13/0077; H04J 13/0062; H04J 13/14; H04J 13/22; H04L 1/1812;
(Continued)

(56) References Cited

U.S. PATENT DOCUMENTS

| 7,643,832 B2 | 1/2010 | Cudak et al. |
| 10,644,916 B1 * | 5/2020 | Shattil ............... H04W 72/0413 |

(Continued)

FOREIGN PATENT DOCUMENTS

| CN | 101335538 A | 12/2008 |
| CN | 101662309 A | 3/2010 |

(Continued)

OTHER PUBLICATIONS

International Search Report and Written Opinion dated Jul. 27, 2018 for International Application No. PCT/CN2017/118059, filed on Dec. 22, 2017 (7 pages).

(Continued)

*Primary Examiner* — Khanh C Tran
(74) *Attorney, Agent, or Firm* — Perkins Coie LLP

(57) ABSTRACT

Methods, systems, and devices related to applying a spreading code to reference signals are described. In one exemplary aspect, a method for wireless communication includes receiving a message indicating a set of control options available to the mobile device for data transmissions. The method includes selecting a spreading code sequence from a number of spreading code sequences, wherein the spreading code sequence corresponds to a control option in the set of control options, wherein the number of spreading code sequences is greater than a length of each of the spreading code sequence, and wherein the spreading code sequences are generated using a method when the length of each of the spreading code sequences is greater than or equal to a value. The method also includes generating a plurality of reference signal symbols using the spreading code sequence, and transmitting the plurality of reference signal symbols.

20 Claims, 8 Drawing Sheets

(51) Int. Cl.
*H04J 13/22* (2011.01)
*H04L 1/18* (2006.01)
*H04L 27/26* (2006.01)

(52) U.S. Cl.
CPC ...... *H04L 27/2605* (2013.01); *H04L 27/2613* (2013.01)

(58) Field of Classification Search
CPC . H04L 27/2602; H04L 27/26; H04L 27/2613; H04L 27/2605; H04L 27/2615
See application file for complete search history.

(56) References Cited

U.S. PATENT DOCUMENTS

| | | | |
|---|---|---|---|
| 2004/0146095 A1* | 7/2004 | Umeno | H04B 1/7093 375/150 |
| 2007/0253471 A1 | 11/2007 | Wilhelmsson et al. | |
| 2009/0022135 A1 | 1/2009 | Papasakellariou et al. | |
| 2014/0177550 A1 | 6/2014 | Liao et al. | |
| 2020/0022081 A1* | 1/2020 | Ljung | H04W 52/0229 |
| 2021/0105079 A1* | 4/2021 | Lei | H04J 11/005 |

FOREIGN PATENT DOCUMENTS

| | | |
|---|---|---|
| CN | 101682419 | 3/2010 |
| CN | 101800572 A | 8/2010 |
| CN | 102577209 | 7/2012 |
| CN | 102769592 | 11/2012 |
| CN | 103944685 | 7/2014 |
| CN | 104782062 | 7/2015 |
| EP | 1942596 A2 | 7/2008 |
| EP | 2211515 A1 | 7/2010 |
| WO | 2008041940 A2 | 4/2008 |
| WO | 2017172279 A1 | 10/2017 |

OTHER PUBLICATIONS

Huawei et al., "Reference signal design for UL grant-free transmission," 3GPP TSG RAN WG1 Meeting #86bis, Lisbon, Portugal, R1-1609446, Oct. 2016 (4 pages).

Extended European Search Report for European Patent Application No. 17935440.2, dated Jul. 5, 2021 (10 pages).

* cited by examiner

SPREADING CODE SEQUENCES FOR REFERENCE SIGNALS

CROSS REFERENCE TO RELATED APPLICATIONS

This patent document is a continuation of and claims benefit of priority to International Patent Application No. PCT/CN2017/118059, filed on Dec. 22, 2017. The entire content of the before-mentioned patent application is incorporated by reference as part of the disclosure of this application.

TECHNICAL FIELD

This patent document is directed generally to digital wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, are being discussed.

SUMMARY

This document discloses methods, systems, and devices related to digital wireless communication, and more specifically, to techniques related to spreading code generation and applying the generated spreading code(s) to reference signals for pre-configured or grant-free transmissions.

In one exemplary aspect, a method for wireless communication is disclosed. The method includes receiving, at a mobile device, a message indicating a set of control options available to the mobile device for data transmissions; selecting a spreading code sequence from a number of spreading code sequences, wherein the spreading code sequence corresponds to a control option in the set of control options, wherein the number of spreading code sequences is greater than a length of each of the spreading code sequence, and wherein the spreading code sequences are generated using a first method when the length of each of the spreading code sequences is greater than or equal to a value; generating a plurality of reference signal symbols using the spreading code sequence; and transmitting, from the mobile device, the plurality of reference signal symbols.

In some embodiments, the first method includes generating the spreading code sequences using a Fourier Transform matrix of dimension N and a permutation of ones and zeros that includes $M=1+C\_N^1+C\_N^2+ \ldots +C\_N^{(N-2)}$ vectors, each vector having a length of N. In some implementations, the value is equal to 3.

In some embodiments, the spreading code sequences are generated using a second method different from the first method when the length of each of the spreading code sequence is less than the value. The second method includes generating the spreading code sequences by combining 1 and a set of primitive Nth roots of unity, N being in a range from 1 to the number of spreading code sequences.

In some embodiments, the set of control options include information of modulation and code schemes, redundancy version, or hybrid automatic repeat request (HARM) process index for data transmissions. In some embodiments, the number of spreading code sequences is equal to or greater than a number of control options.

In another exemplary aspect, a method for wireless communication is disclosed. The method includes receiving, at a mobile device, a message indicating one or more parameters and a number of spreading code sequences for data transmissions, wherein the spreading code sequences are generated using a first method when the length of each of the spreading code sequences is greater than or equal to a value; generating a reference signal sequence using the one or more parameters and a spreading code sequence from the spreading code sequences, wherein the number of spreading code sequences is greater than the length of each of the spreading code sequence; and transmitting, from the mobile device, the reference signal sequence.

In some embodiments, the first method includes generating the spreading code sequences using a Fourier Transform matrix of dimension N and a permutation of ones and zeros that includes $M=1+C\_N^1+C\_N^2+ \ldots +C\_N^{(N-2)}$ vectors, each vector having a length of N. In some implementations, the value is equal to 3.

In some embodiments, the spreading code sequences are generated using a second method different from the first method when the length of each of the spreading code sequence is less than the value. The second method includes generating the spreading code sequences by combining 1 and a set of primitive Nth roots of unity, N being in a range from 1 to the number of spreading code sequences.

In some embodiments, the one or more parameters indicate a number of Zadoff-Chu roots or a number of cyclic shifts. In some implementations, generating the reference signal further comprises generating a legacy reference signal symbol using the one or more parameters; obtaining a legacy reference signal sequence by repeating the legacy reference signal symbol for N times, wherein N is the length of each of the spreading code sequence; selecting the spreading code sequence from the spreading code sequences; and multiplying, element-by-element, the legacy reference signal sequence with the spreading code sequence to obtain the reference signal sequence.

In some embodiments, the one or more parameters indicate a legacy reference signal sequence. In some implementations, generating the reference signal further comprises selecting the spreading code sequence from the spreading code sequences; and multiplying, element-by-element, at least a part of the legacy reference signal sequence with the spreading code sequence to obtain the reference signal sequence.

In another exemplary aspect, a method for wireless communication is disclosed. The method includes transmitting, to a mobile device, a message indicating a set of control options available to the mobile device for data transmissions; and receiving, from the mobile device, a plurality of reference signal symbols, wherein the plurality of reference signal symbols is generated using a spreading code sequence selected from a number of spreading code sequences, wherein the spreading code sequence corresponds to a control option in the set of control options, wherein the number of spreading code sequences is greater than a length of each of the spreading code sequence, and wherein the spreading code sequences are generated using a first method when the length of each of the spreading code sequences is greater than or equal to a value.

In some embodiments, the first method includes generating the spreading code sequences using a Fourier Transform matrix of dimension N and a permutation of ones and zeros that includes M=1+C_N^1+C_N^2+ . . . +C_N^(N−2) vectors, each vector having a length of N. In some implementations, the value is equal to 3.

In some embodiments, the spreading code sequences are generated using a second method different from the first method when the length of each of the spreading code sequence is less than the value. The second method includes generating the spreading code sequences by combining 1 and a set of primitive Nth roots of unity, N being in a range from 1 to the number of spreading code sequences.

In some embodiments, the set of control options include information of modulation and code schemes, redundancy version, or hybrid automatic repeat request (HARM) process index for data transmissions. In some embodiments, the number of spreading code sequences is equal to or greater than a number of control options.

In another exemplary aspect, a method for wireless communication is disclosed. The method includes transmitting, to a mobile device, a message indicating one or more parameters and a number of spreading code sequences for data transmissions, wherein the spreading code sequences are generated using a first method when the length of each of the spreading code sequences is greater than or equal to a value; and receiving, from the mobile device, a reference signal sequence, wherein the reference signal sequence is generated using the one or more parameters and a spreading code sequence from the spreading code sequences, and wherein the number of spreading code sequences is greater than the length of each of the spreading code sequence.

In some embodiments, the first method includes generating the spreading code sequences using a Fourier Transform matrix of dimension N and a permutation of ones and zeros that includes M=1+C_N^1+C_N^2+ . . . +C_N^(N−2) vectors, each vector having a length of N. In some implementations, the value is equal to 3.

In some embodiments, the spreading code sequences are generated using a second method different from the first method when the length of each of the spreading code sequence is less than the value. The second method includes generating the spreading code sequences by combining 1 and a set of primitive Nth roots of unity, N being in a range from 1 to the number of spreading code sequences.

In some embodiments, the one or more parameters indicate a number of Zadoff-Chu roots or a number of cyclic shifts. In some embodiments, the one or more parameters indicate a legacy reference signal sequence.

In another exemplary aspect, a wireless communications apparatus comprising a processor is disclosed. The processor is configured to implement a method described herein.

In yet another exemplary aspect, the various techniques described herein may be embodied as processor-executable code and stored on a computer-readable program medium.

The details of one or more implementations are set forth in the accompanying attachments, the drawings, and the description below. Other features will be apparent from the description and drawings, and from the claims.

DETAILED DESCRIPTION

Figure 1:
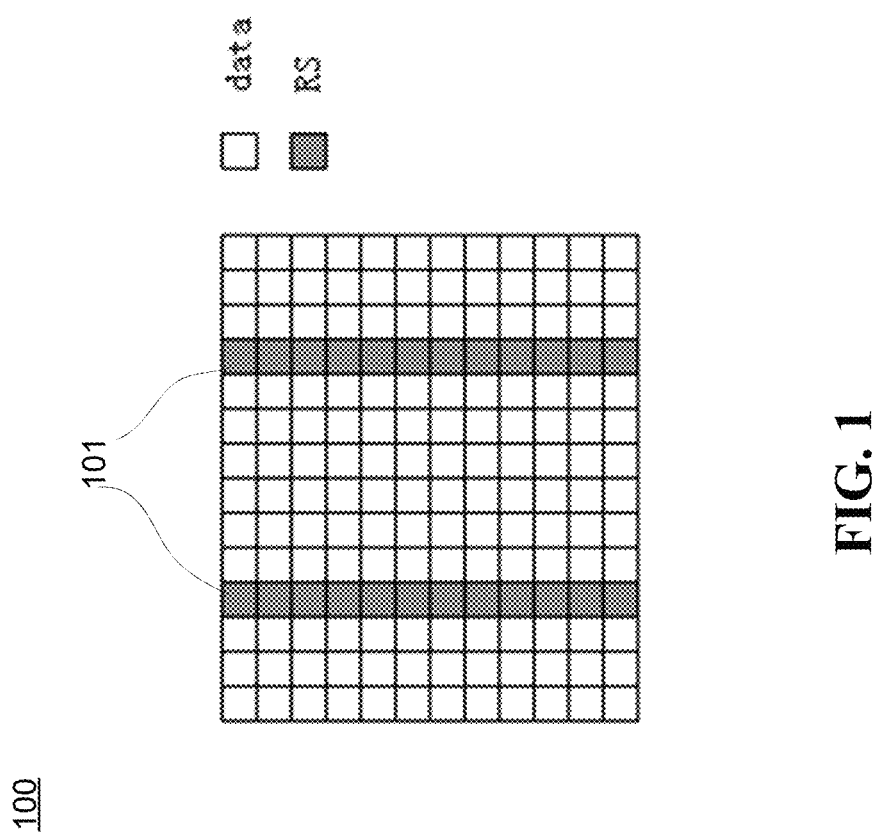
FIG. 1 shows a schematic diagram of an exemplary uplink signal in current Long Term Evolution (LTE) systems.

With the continuous development of wireless communication technologies, a wide range of wireless communication services are emerging. The development of Internet of Things (IoT), for example, allows a huge amount of small devices (e.g., sensors and/or appliances) to communicate in cellular networks. The network traffic from these small devices tends to be sporadic and includes small data packages. Such traffic is quite different from the traditional types of network traffic, such as voice or data services.

One of the challenges posed by IoT communication is to achieve resource efficiency while supporting massive connections. Because the IoT traffic tends to be sporadic and the amount of data is small, control signaling to setup and/or release connections between user equipment (UE) and base stations (BS) may occupy more network resources than required resources for data transmissions. As a result, control channels can become a bottleneck in IoT transmissions. To reduce signaling overhead and achieve higher resource efficiency, two possible transmission mechanisms—resource pre-configuration and grant-free transmission—can be utilized.

Resource pre-configuration means pre-arranging physical resources in time and/or frequency domain for a specific UE. For example, semi-persistent scheduling (SPS) has been used to support voice transmission in the Long Term Evolution (LTE) networks (VoLTE).

In LTE systems, resource allocation information for the Physical Downlink Shared Channel (PDSCH) and/or the Physical Uplink Shared Channel (PUSCH) is carried by the Physical Downlink Control Channel (PDCCH). The amount Orthogonal Frequency Division Multiplex (OFDM) symbols allowed for the PDCCH, however, is limited. For example, only 1-3 OFDM symbols are allowed per subframe to carry PDCCH information. As a result, using the dynamic scheduling (i.e., a one-to-one correspondence between a PDCCH signaling and a PDSCH/PUSCH allocation), the number of UEs that can be concurrently supported is limited.

Semi-persistent scheduling (SPS) was introduced to address this limitation. With SPS, a UE is pre-configured by the base station with a SPS Radio Network Temporary Identifier (SPS-RNTI). A resource is allocated using the SPS-RNTI (instead of typical C-RNTI) and a periodicity (e.g., 200 ms). During SPS, the allocated resource is used by the UE according to the pre-configured periodicity.

SPS is well suited to periodic communication, such as VoLTE, so that more UEs can be supported without increasing PDCCH resources. However, transmission parameters, such as Modulation and Coding Scheme (MCS), are fixed for a given SPS allocation. To guarantee an acceptable failure rate per transmission, conservative modulation and coding schemes are generally used. Therefore, when channel conditions change, a new SPS allocation is needed. Furthermore, any incremental redundancy re-transmissions (e.g., Hybrid Automatic Repeat reQuest (HARQ) based re-transmissions) will be separately scheduled using dynamic scheduling. Thus, SPS is not so efficient for IoT traffic because its periodicity can be too long for a fixed MCS, leading to low resource efficiency. Dynamic scheduling of HARQ may also be too costly.

Grant-free transmission, on the other hand, originates from the ALOHA method in Ethernet communication. The ALOHA method allows multiple UEs to transmit using the same frequency resources. When collision happens, each collided UE chooses a random delay for re-transmission. An improved ALOHA method, also known as Slotted ALOHA (S-ALOHA), allows UEs to share a common transmission period and a common start time to start their transmissions. Using the S-ALOHA method, the chance of collision can be reduced by half as compared with the traditional ALOHA method.

For wireless communication systems under a centric control by the BS, periodic downlink (DL) broadcast from the BS enables UEs to synchronize their uplink (UL) transmissions, thereby facilitating the usage of S-ALOHA. Theoretically, the maximum channel utilization for S-ALOHA is $e^{-1}$, or about 37%. However, for IoT scenarios with a massive amount of connections (e.g., ~$10^6$ connections per km$^2$), the efficiency and stability of the S-ALOHA method becomes questionable due to severe data package collisions, leading to low resource efficiency or even worse, malfunction of the whole system.

To improve resource efficiency of the S-ALOHA method, various non-orthogonal multiple access (NOMA) schemes have been proposed to allow UEs to share the same time-frequency resources. However, collision avoidance and demodulation of reference signals are still the key issues to address in order to ensure good reception (i.e., accurate channel estimation) for NOMA schemes. For example, in LTE systems, 64 preambles are provided per cell for Random Access Channels (RACH). If a large amount of UEs want to access the network using randomly selected preambles, the collision probability increases rapidly as the number of UEs increases. For IoT applications with a massive number of connections, it is thus desirable to have a much larger reference signal pool to allow accurate UE detection and channel estimation with simultaneous UEs transmissions.

Figure 2:
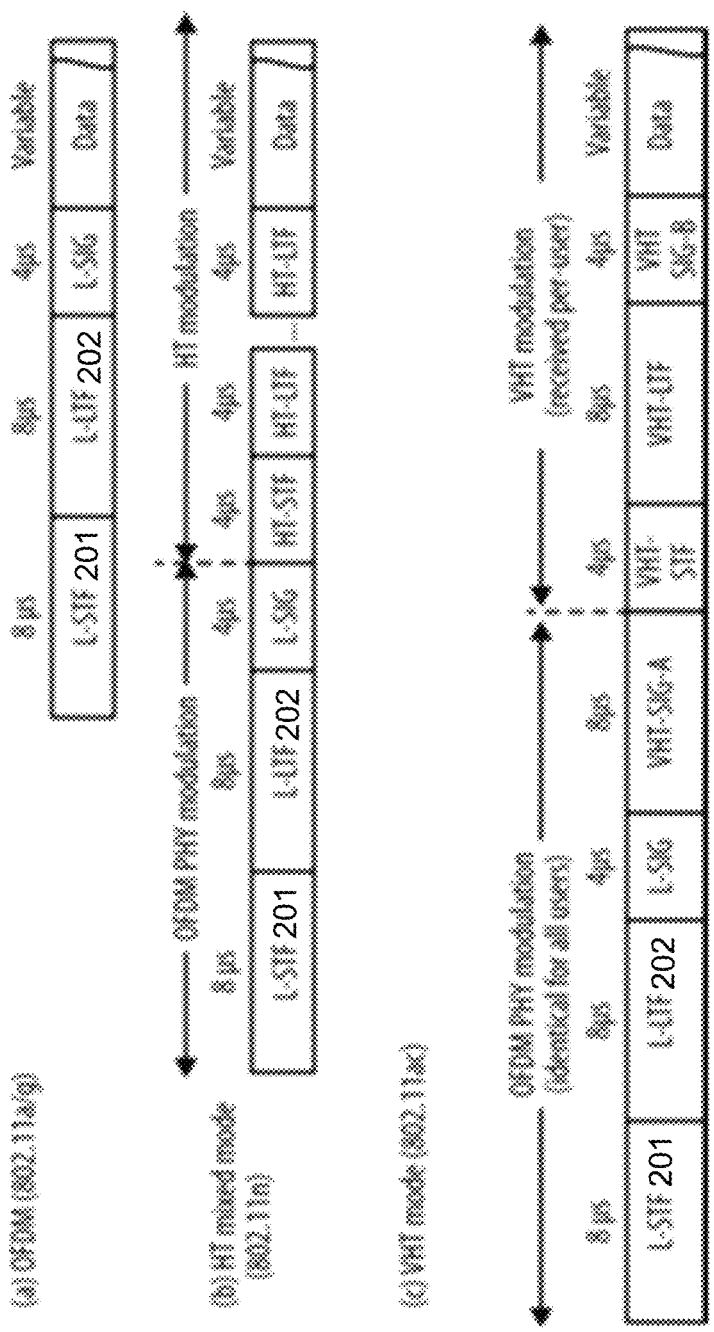
FIG. 2 shows a schematic diagram of signal modulation according to the WiFi 802.11 standards.

In current systems, the reference signal pool may be limited. FIG. 1 shows a schematic diagram of an exemplary uplink signal in current LTE systems. The uplink signal 100 includes two reference signal (RS) symbols 101 to facilitate channel estimation and physical impairment measurement. There is no spreading code applied to these reference signal symbols. FIG. 2 shows a schematic diagram of signal modulation according to the WiFi 802.11 standards. In 802.11a/g/n/ac systems, a common reference signal head—Non-HT Short Training Field (L-STF) 201 and Non-HT Long Training Field (L-LTF) 202—is added before control and data to enable UE detection and channel estimation. There are ten identical symbols in L-STF (short) and two identical symbols in L-LTF (long) respectively. The symbols in the reference signal are simply repeated. In a way, the repetition is equivalent to spreading with the reference signal with a spreading code having all ones. However, such spreading does not greatly increase the amount of available reference signals.

This patent document describes the generation of a spreading code set and methods of applying the spreading code set to reference signals to obtain a larger pool of reference signals. By having a larger pool of reference signals, control information may be conveyed as a part of reference signal transmission without incurring any signaling overhead. A larger reference signal pool also reduces the probability of UE data collisions in grant-free transmissions, thereby increasing resource efficiency for IoT scenarios.

Spreading Code Generation

An orthogonal spreading code set, such as an N×N code matrix, may spread a reference signal having N symbols into a pool of N reference signals. However, when N is a small value (e.g., 2 or 3), the pool is still too small to effectively carry control information or reduce transmission collisions. Therefore, it is desirable to use a non-orthogonal spreading code set, such as a code matrix having M entries (M>>N), to ensure that the reference signal can be sufficiently spread. Details regarding the generation of the spreading code are described as follows.

Length-2 Codebook

A length-2 codebook can be applied to reference signals that have a length of 2 (i.e., $N_{code}$=2).

The full code set is given by [1 1; 1 ω; . . . ; 1 ω$^2$; . . . ; 1 ω$^{M-1}$], wherein $$\omega = e^{j\frac{2\pi}{M}},$$

and M>$N_{code}$. The value of M can be determined based on the number of control options ($N_{option}$) available to the UE, which will be discussed in connection with FIGS. 3-4. The value of M can also be determined by the desirable side of the reference signal pool. In some embodiments, both the BS and the UE can store a subset of the full code set.

Length-3 Codebook

A length-3 codebook can be applied to reference signals that have a length of 3 (i.e., $N_{code}$=3).

The length-3 codebook can be generated using the following steps:

1.1: Prepare a base code set given by a Fourier Transform matrix [1 1 1; 1 ω ω$^2$; 1 ω$^2$ ω$^4$], where $$\omega = e^{j\frac{2\pi}{3}}.$$

1.2: Prepare a spreading code matrix given as [1 1 1; 1 1 0; 1 0 1; 0 1 1].

1.3: Select an entry from the base code set (e.g., [1 ω ω$^2$]). Select another entry from the spreading code matrix (e.g., [1 0 1]). Perform an element-to-element multiplication using these two entries to obtain a new entry of the code set (e.g., [1 0 ω$^2$]). Perform this step for all entries in the base code set and the spreading code matrix to obtain a full code set.

The full code set includes 12 entries, which are: [1 1 1; 1 ω ω$^2$; 1 ω$^2$ ω$^4$; 1 1 0; 1 ω 0; 1 ω$^2$ 0; 1 0 1; 1 0 ω$^2$; 1 0 ω$^4$; 0 1 1; 0 ω ω$^2$; 0 ω$^2$ ω$^4$].

Length-4 Codebook

A length-4 codebook can be applied to reference signals that have a length of 4 (i.e., $N_{code}$=4).

The length-4 codebook can be generated using the following steps:

2.1: Prepare a base code set given by a Fourier Transform matrix [1 1 1 1; 1 ω ω² ω³; 1 ω² ω⁴ ω⁶; 1 ω³ω⁶ ω⁹], where $$\omega = e^{j\frac{2\pi}{4}}.$$

2.2: Prepare a spreading code matrix given as [1 1 1 1; 1 1 1 0; 1 1 0 1; 1 0 1 1; 0 1 1 1; 0 0 1 1; 0 1 1 0; 1 1 0 0; 1 0 0 1; 1 0 1 0; 0 1 0 1].

2.3: Select an entry from the base code set (e.g., [1 ω ω² ω³]). Select another entry from the spreading code matrix (e.g., [1 0 1 1]). Perform an element-to-element multiplication using these two entries to obtain a new entry of the code set (e.g., [1 0 ω² ω³]). Perform this step for all entries in the base code set and the spreading code matrix to obtain a full code set.

The full code set includes 4×11=44 entries.

Length-N Codebook

The generation method used for length-3 and length-4 codebook can be generalized and applied to length-N, wherein $N_{code}$>2. A length-N codebook can be applied to reference signals that have a length of N (i.e., $N_{code}$=N).

The length-N codebook can be generated using the following steps:

2.1: Prepare a base code set given by a Fourier Transform matrix having a dimension N, where $$\omega = e^{j\frac{2\pi}{N}}.$$

2.2: Prepare a spreading code matrix. The spreading code matrix is generated using (1) one length-N vector including all ones, (2) $C_N^1$ number of length-N vectors, each having N−1 ones and 1 zero (3) $C_N^2$ number of length-N vectors, each having N−2 ones and 2 zero, . . . , and (N−1) $C_N^{N-2}$ number of length-N vectors, each having 2 ones and N−2 zero. The number of entries in the spreading code matrix is given by $M=1+C_N^1+C_N^2+ \ldots +C_N^{N-2}$.

2.3: Select an entry from the base code set. Select another entry from the spreading code matrix. Perform an element-to-element multiplication using these two entries to obtain a new entry of the code set. Perform this step for all entries in the base code set and the spreading code matrix to obtain a full code set.

The full code set includes M entries (M>N), each entry having a length of N.

Resource Pre-Configuration

The spreading code as discussed above can be applied to reference signals in resource pre-configuration scenarios to carry control information such as Modulation and Coding Schemes (MCS), Redundancy Version (RV) and/or HARQ process index.

Figure 3:
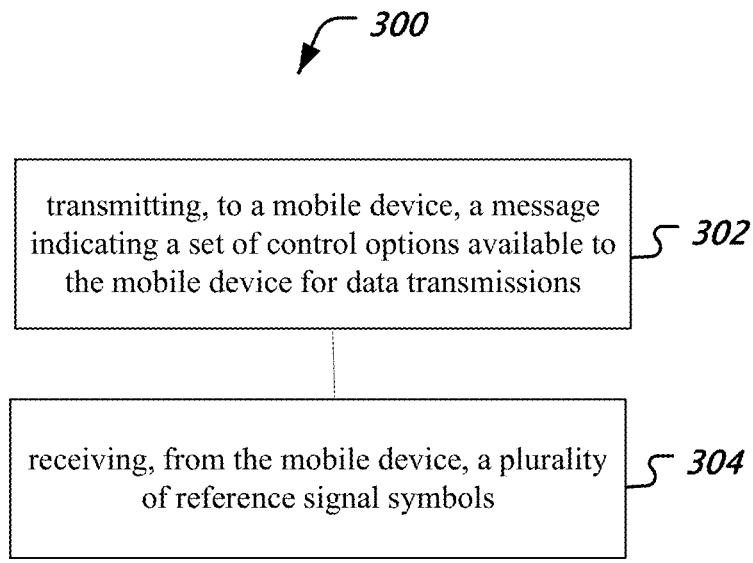
FIG. 3 is a flowchart representation of a method for wireless communication.

FIG. 3 is a flowchart representation of a method for wireless communication. The method 300 includes, at 302, transmitting, to a mobile device, a message indicating a set of control options available to the mobile device for data transmissions. The method also includes, at 304, receiving, from the mobile device, a plurality of reference signal symbols.

In the pre-configuration stage (e.g., in SPS configuration for a target UE), the base station can inform the UE of the available control options for MCS, RV, and/or HARQ process index. The number of available options is denoted as $N_{option}$. A spreading code set with M entries is stored by the BS, wherein M>=$N_{option}$. In some embodiments, M=$N_{option}$ and an one-to-one mapping between the control options and the spreading codes can be established and/or stored by the base station. In some embodiments, M>$N_{option}$, and the base station may choose to use only a part of the spreading codes in the code set. For example, the BS may select a subset of the spreading codes from the code set according to a predefined rule. In some implementation, the predefined rule may limit the selection of the spreading codes to the first $N_{option}$ entries in the complete code set, and the remaining M-$N_{option}$ entries are considered to be reserved.

Figure 4:
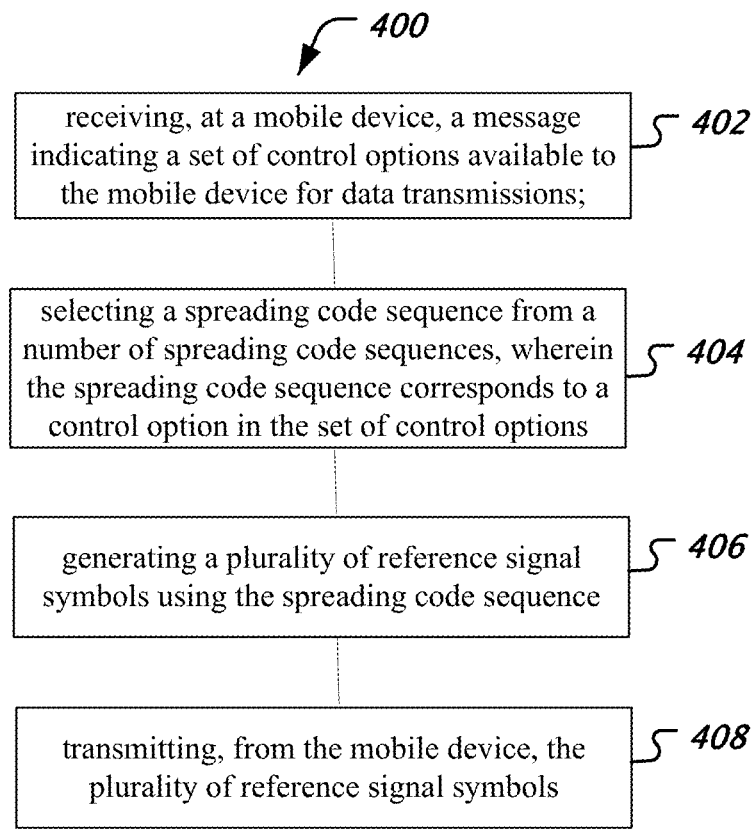
FIG. 4 is a flowchart representation of another method for wireless communication.

FIG. 4 is a flowchart representation of a method for wireless communication. The method 400 includes, at 402, receiving, at a mobile device, a message indicating a set of control options available to the mobile device for data transmissions. In some embodiments, the target UE receives available control options from the base station via PDCCH. The control options can include a combination of MCS, RV, and/or HARQ process index according to channel status and/or previous transmission status. The target UE may also store the spreading code set with M codes, wherein M>=$N_{option}$.

The method 400 includes, at 404, selecting a spreading code sequence from a number of spreading code sequences, wherein the spreading code sequence corresponds to a control option in the set of control options. It is noted that the number of spreading code sequences M is greater than the length of each of the spreading code sequence $N_{code}$. In some embodiments, M=$N_{option}$, so the UE uses the same one-to-one mapping between the control options and the spreading codes as the BS. In some embodiments, M>$N_{option}$, and the UE may choose to use only a part of the spreading codes in the code set. For example, the UE may select a subset of the spreading codes from the code set according to the same predefined rule used by the BS. In some implementation, the predefined rule may limit the selection of the spreading codes to the first $N_{option}$ entries in the complete code set; the remaining M-$N_{option}$ entries are considered to be reserved.

The method 400 includes, at 406, generating a plurality of reference signal symbols using the spreading code sequence. The reference signal symbols can be generated by multiplying, element by element, the original reference signal with the spreading code sequence. The method 400 also includes, at 408, transmitting, from the mobile device, the plurality of reference signal symbols.

The BS then receives the plurality of reference signal symbols from the UE. The BS uses its stored code set to match the code carried by the reference signal symbols. The matched code allows the BS to detect UE's control option (e.g., MCS, RV and/or HARQ process index). The BS then uses the detected control option to decode the data symbols from the UE.

Details of the techniques for resource pre-configuration scenarios are further described in the following embodiments.

Example Embodiment 1

A length-2 codebook with four entries is given by [1 1; 1 j; 1 −1; 1 −j] (i.e., M=4). With this codebook, the reference signal carries control information to indicate the MCS selected by UE. Table 1 shows an example of MCS options for a length-2 codebook.

TABLE 1

Exemplary MCS options for a length-2 codebook

| Code carried on reference signal | Modulation | Code rate |
|---|---|---|
| [1 1] | BPSK | 1/2 |
| [1 j] | BPSK | 1/3 |
| [1 −1] | QPSK | 1/2 |
| [1 −i] | QPSK | 1/3 |

When the BS receives a reference signal from a given UE, it retrieves the carried spreading code by correlating the two symbols of the reference signal. The retrieved code helps the BS properly decode and demodulate data symbols.

Example Embodiment 2

A length-3 codebook with 12 entries is given by [1 1 1; 1 $\omega$ $\omega^2$; 1 $\omega^2$ $\omega^4$; 1 1 0; 1 $\omega$ 0; 1 $\omega^2$ 0; 1 0 1; 1 0 $\omega^2$; 1 0 $\omega^4$; 0 1 1; 0 $\omega$ $\omega^2$; 0 $\omega^2$ $\omega^4$], where $$\omega = e^{j\frac{2\pi}{3}}.$$

With this codebook, the reference signal carries control information to indicate the MCS and RV selected by UE. Table 2 shows an example of MCS and RV options for a length-3 codebook.

TABLE 2

Exemplary MCS and RV options for a length-3 codebook

| Code carried on reference signal | Modulation | Code rate | RV |
|---|---|---|---|
| [1 1 1] | BPSK | 1/2 | 0 |
| [1 $\omega$ $\omega^2$] | BPSK | 1/2 | 1 |
| [1 $\omega^2$ $\omega^4$] | BPSK | 1/2 | 2 |
| [1 1 0] | BPSK | 1/3 | 0 |
| [1 $\omega$ 0] | BPSK | 1/3 | 1 |
| [1 $\omega^2$ 0] | BPSK | 1/3 | 2 |
| [1 0 1] | QPSK | 1/2 | 0 |
| [1 0 $\omega^2$] | QPSK | 1/2 | 1 |
| [1 0 $\omega^4$] | QPSK | 1/2 | 2 |
| [0 1 1] | QPSK | 1/3 | 0 |
| [0 $\omega$ $\omega^2$] | QPSK | 1/3 | 1 |
| [0 $\omega^2$ $\omega^4$] | QPSK | 1/3 | 2 |

When BS receives a reference signal from a given UE, it detects energy of the symbols and locates the possible zero-value symbol. The BS then retrieves the carried spreading code by correlating the non-zero symbols of the reference signal. The retrieved code helps the BS properly decode and demodulate data symbols.

Example Embodiment 3

A length-2 codebook with 4 entries is given by [1 1; 1 j; 1 −1; 1 −j] (i.e., M=4). With this codebook, the reference signal carries control information to indicate HARQ process index selected by UE. Table 1 shows an example of HARQ process index options for a length-2 codebook.

TABLE 3

Exemplary HARQ process index options for a length-2 codebook

| Code carried on reference signal | HARQ process index |
|---|---|
| [1 i] | 1 |
| [1 j] | 2 |
| [1 −1] | 3 |
| [1 −j] | 4 |

When the BS receives a reference signal from a given UE, it retrieves the carried spreading code by correlating the two symbols of the reference signal. The retrieved code helps the BS determine the HARQ process index of current data part and facilitate possible HARQ combining with previous received data packages.

Grant-Free Transmission

In grant-free transmissions, a reference signal pool is provided to UEs. A UE randomly selects one of the reference signals and transmits it along with the data. The reference signal facilitates UE detection and channel estimation on the base station side. In LTE systems, the Random Access Channel (RACH) is an example of the legacy reference signal design. The legacy reference signal pool includes one or more Zadoff-Chu (ZC) sequences with different roots $N_{root}$ and cyclic shifts $N_{cs}$. The number of available reference signal in a legacy reference signal pool is $N_{rs} = N_{root} \times N_{cs}$.

The spreading code as discussed above can be applied to the legacy reference signal pool in grant-free transmission scenarios to increase the size of reference signal pool, thereby reducing the probability of transmission collisions.

For example, a legacy reference signal has a length of L (i.e., the legacy reference signal has L symbols). A spreading code can be chosen from the spreading code set to be applied to the legacy reference signal. The spreading code length $N_{code} \leq L$. If $N_{code} = L$, an element-by-element multiplication is performed such that each element of the spreading code is applied to each symbol of the reference signal. If $N_{code} < L$, a subset of the reference signal symbols is selected, based on a predefined rule, to match the spreading code length. In some implementations, the predefined rule may limit the selection of reference signal symbols to be the first $N_{code}$ symbols, leaving the remaining $L - N_{code}$ symbols unchanged. Then, an element-by-element multiplication is performed such that each element of the spreading code is applied to each symbol of the selected subset of reference signal.

As discussed above, using an orthogonal spreading code can spread a reference signal into a pool of $N_{code}$ reference signals, at the cost of occupying $N_{code}$ resources. The original pool of $N_{rs} = N_{root} \times N_{cs}$, therefore, can be spread into a larger pool of $N'_{rs} = N_{root} \times N_{cs} \times N_{code}$. The use of non-orthogonal spreading codes can further expand the size of the reference signal pool. A new pool of $N''_{rs} = N_{root} \times N_{cs} \times M$ can be generated, wherein $M > N_{code}$.

Figure 5:
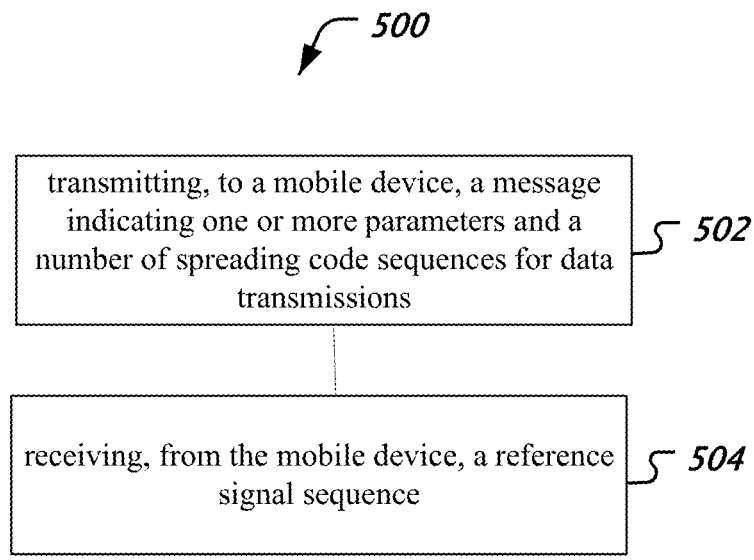
FIG. 5 is a flowchart representation of another method for wireless communication.

FIG. 5 is a flowchart representation of a method for wireless communication. The method 500 includes, at 502, transmitting, to a mobile device, a message indicating one or more parameters and a number of spreading code sequences for data transmissions. The method also includes, at 504, receiving, from the mobile device, a reference signal sequence.

In a grant-free transmission scenario, the BS informs a group of UEs of their common reference signal configuration (including $N_{root}$ and $N_{cs}$) in the common DCI configuration via PDCCH. The BS may also inform the group of UEs the spreading code pool that has M spreading code entries.

Figure 6:
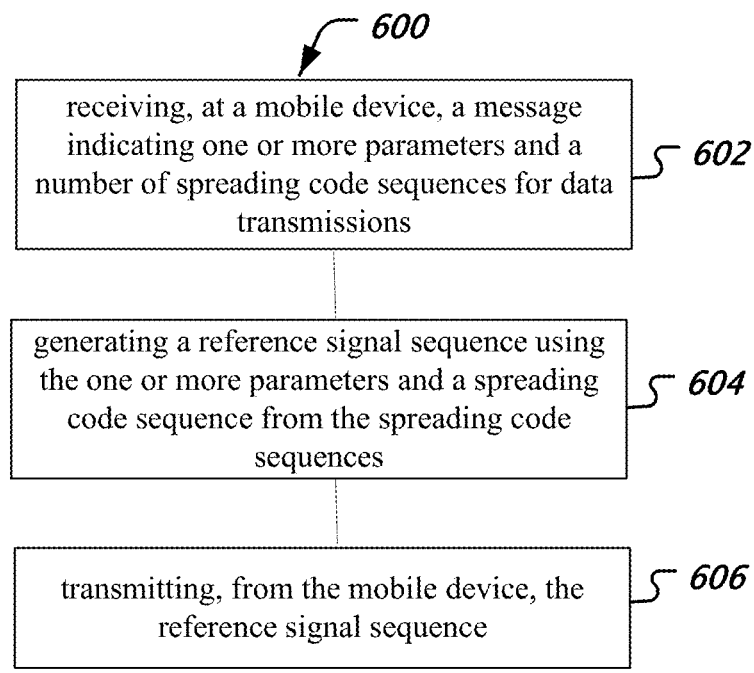
FIG. 6 is a flowchart representation of another method for wireless communication.

FIG. 6 is a flowchart representation of a method for wireless communication. The method 600 includes, at 602, receiving, at a mobile device, a message indicating one or more parameters and a number of spreading code sequences for data transmissions. In some embodiments, a UE in a group of UEs receives common DCI configuration from the BS. The common DCI configuration includes parameters such as $N_{root}$ and $N_{cs}$ for generating a legacy reference signal. The common DCI configuration also includes an indicator to indicate the spreading codebook pool that has M codes. The UE is then able to generate a reference signal pool that includes $N''_{rs}=N_{root} \times N_{cs} \times M$ reference signals, wherein $M > N_{code}$.

The method includes, at 604, generating a reference signal sequence using the one or more parameters and a spreading code sequence from the spreading code sequences. The reference signal can be generated as follows:

3.1: Generate a legacy reference signal symbol using a selected root and cyclic shift.

3.2: Repeat the legacy reference signal symbol $N_{code}$ times to obtain a legacy reference signal sequence.

3.3: Select a $N_{code}$-length spreading code from the codebook that includes M entries.

3.4: Perform an element-by-element multiplication of the repeated legacy reference signal sequence and the $N_{code}$-length spreading code to obtain a reference signal sequence.

Alternatively, the one or more parameters indicate a legacy reference signal having a length of L. The reference signal can be generated as follows:

4.1: If $L=N_{code}$, perform an element-by-element multiplication of the legacy reference signal and the $N_{code}$-length spreading code to obtain a reference signal sequence.

4.2: If $L > N_{code}$, select a subset of the legacy reference signal. The subset of the legacy reference signal includes $N_{code}$ symbols. Perform an element-by-element multiplication of the subset and the $N_{code}$-length spreading code to obtain a reference signal sequence.

The method also includes, at 606, transmitting, from the mobile device, the reference signal sequence.

After receiving the reference signal sequence at the BS, the BS may perform the following steps to assist UE detection and channel estimation.

Despreading:

BS may despread the reference signal sequence by (1) applying the conjugated $N_{code}$-length spreading code on $N_{code}$ reference signal symbols using an element-by-element multiplication, and (2) summing up the $N_{code}$ reference signal symbols.

Detection:

For each despread reference signal, the BS compares the signal energy on $N_{root} \times N_{cs}$ windows with a threshold. If the signal energy exceeds the corresponding threshold, a flag indicating UE existence on the corresponding code index, root, and cyclic shift is set to true.

Channel Estimation:

For each combination of root and cyclic shift with a true flag, channel estimation can be carried out for the strongest code indices.

Details of the techniques for grant-free transmission scenarios are further described in the following embodiments.

Example Embodiment 4

In this embodiment, a legacy LTE RACH-style sequence having a length of 144 is generated using a length-139 cyclic-padded ZC sequence. A phase rotation sequence is generated to carry a specific cyclic shift. With four ZC roots ($N_{root}=4$) and cyclic shift resolution of $2\pi/16$ ($N_{cs}=16$), a legacy reference signal pool with $4 \times 16=64$ entries is obtained. A length-2 codebook ($N_{code}=2$) with 4 entries is given by [1 1; 1 j; 1 −1; 1 −j] (i.e., $M=4$, $M > N_{code}$). With this codebook, the size of the legacy reference signal pool can be extended to $4 \times 16 \times 4=256$ entries. A UE can randomly select a combination of ZC root, cyclic shift, and a spreading code from the code set to generate its reference signal symbols.

Figure 7:
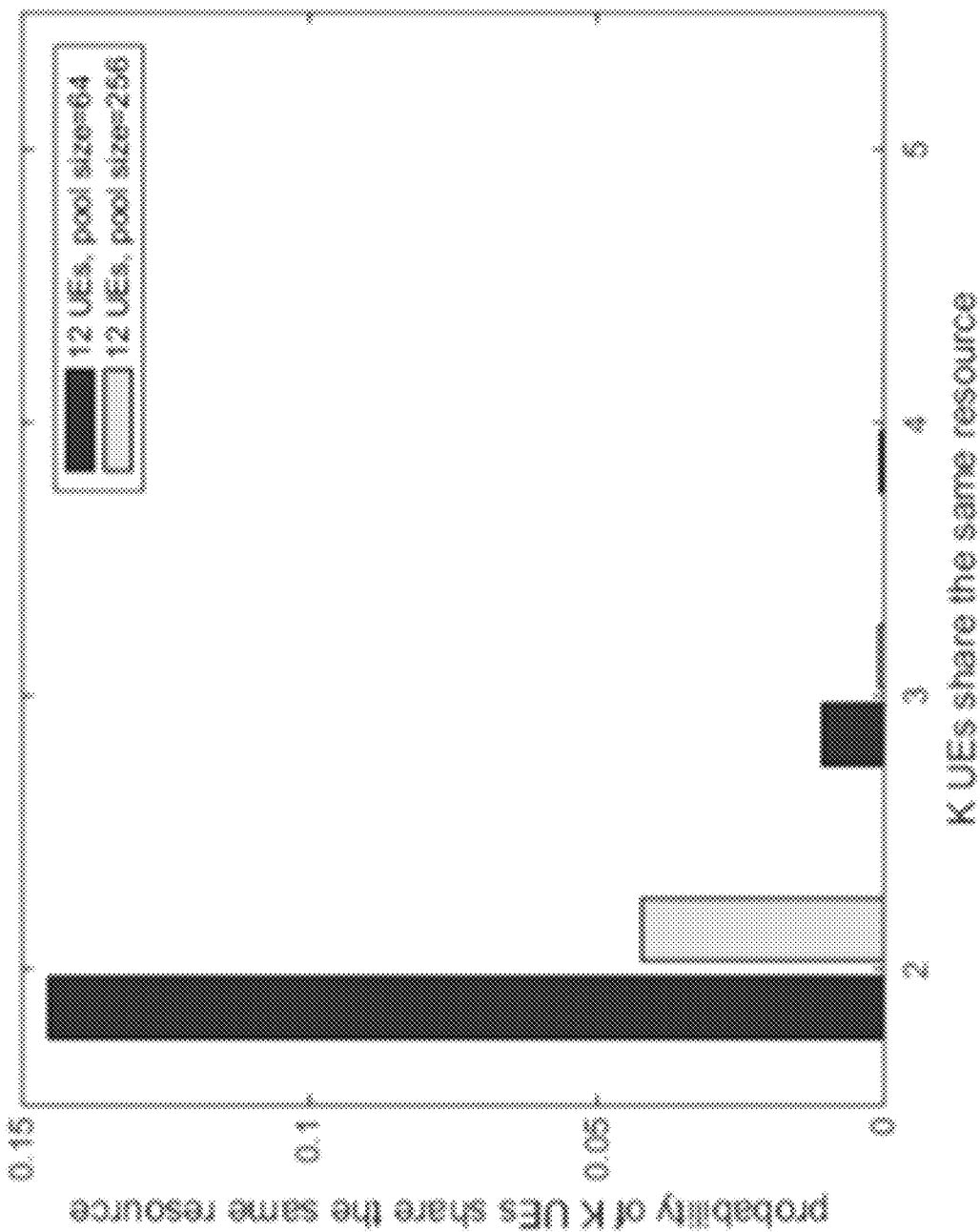
FIG. 7 shows an exemplary plot of the probability of multiple user equipment sharing the same resources.

FIG. 7 shows an exemplary plot of the probability of multiple UEs (i.e., K UEs) sharing the same resources. It is evident that, with an enlarged reference signal pool of 256 entries, the collision probability between two UEs decreases from 15% to 4%. The collision probability between three UEs decreases from 1.1% to 0.1%.

A given combination of ZC root and cyclic shift can indicate more than one multiplexed UE. The BS, after receiving the reference signal sequence, coherently combines the two reference symbols with 4 spreading codes. Based on the four combining results, BS selects fewer than three spreading codes with largest combining energy and estimates propagation channel for the hypothesized UEs. The rationale behind this selection is that the probability of three UEs multiplexed on a given combination of ZC root and cyclic shift is very small (~1%).

Example Embodiment 5

In this embodiment, a legacy LTE RACH-style sequence with length of 144 is generated using a length-139 cyclic-padded ZC sequence. A phase rotation sequence is generated to carry a specific cyclic shift. With four ZC roots ($N_{root}=4$) and cyclic shift resolution of $2\pi/16$ ($N_{cs}=16$), a reference signal pool with $4 \times 16=64$ entries is obtained. A length-3 codebook ($N_{code}=3$) with 12 entries is given by [1 1 1; 1 $\omega$ $\omega^2$; 1 $\omega^2$ $\omega^4$; 1 1 0; 1 $\omega$ 0; 1 $\omega^2$ 0; 1 0 1; 1 0 $\omega^2$; 1 0 $\omega^4$; 0 1 1; 0 $\omega$ $\omega^2$; 0 $\omega^2$ $\omega^4$] (i.e., $M=12$, $M > N_{code}$). With this codebook, the size of the legacy reference signal pool can be extended to $4 \times 16 \times 12=768$ entries. A UE can randomly select a combination of ZC root, cyclic shift, and a spreading code from the code set to generate its reference signal symbols.

Figure 8:
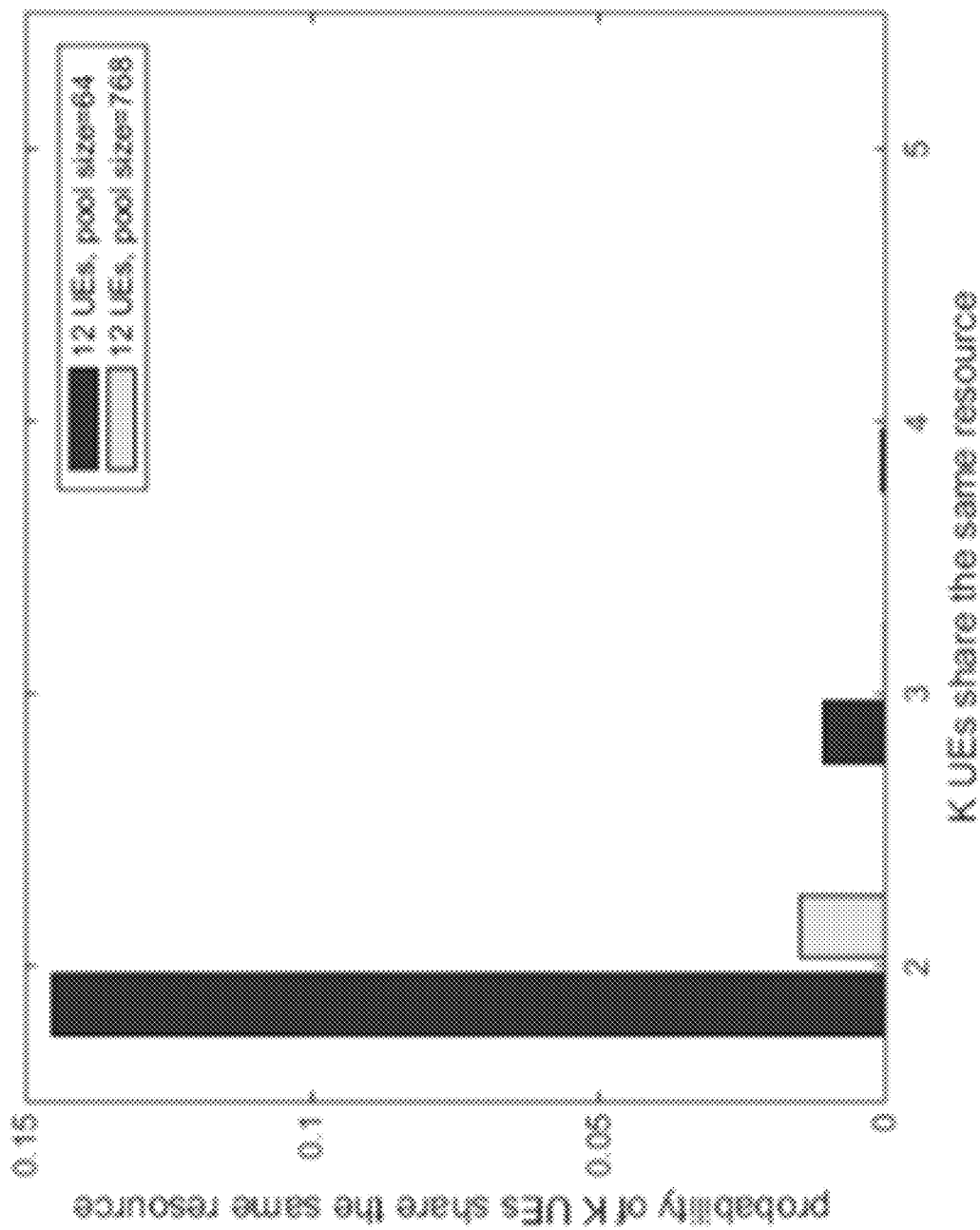
FIG. 8 shows another exemplary plot of the probability of multiple user equipment sharing the same resources.

FIG. 8 shows another exemplary plot of the probability of multiple UEs (i.e., K UEs) sharing the same resources. It is evident that, with an enlarged reference signal pool of 768 entries, the collision probability between two UEs decreases from 15% to 1%. The collision probability between three UEs decreases from 1.1% to 0.01%.

A given combination of ZC root and cyclic shift can indicate more than one multiplexed UE. The BS, after receiving the reference signal sequence, coherently combines the three reference symbols with these 12 spreading codes. Based on the 12 combining results, BS selects fewer than four spreading codes with largest combining energy and estimates propagation channel for the hypothesized UEs. The rationale behind this selection is that the probability of four UEs multiplexed on a given combination of ZC root and cyclic shift is very small (~0.06%).

Figure 9:
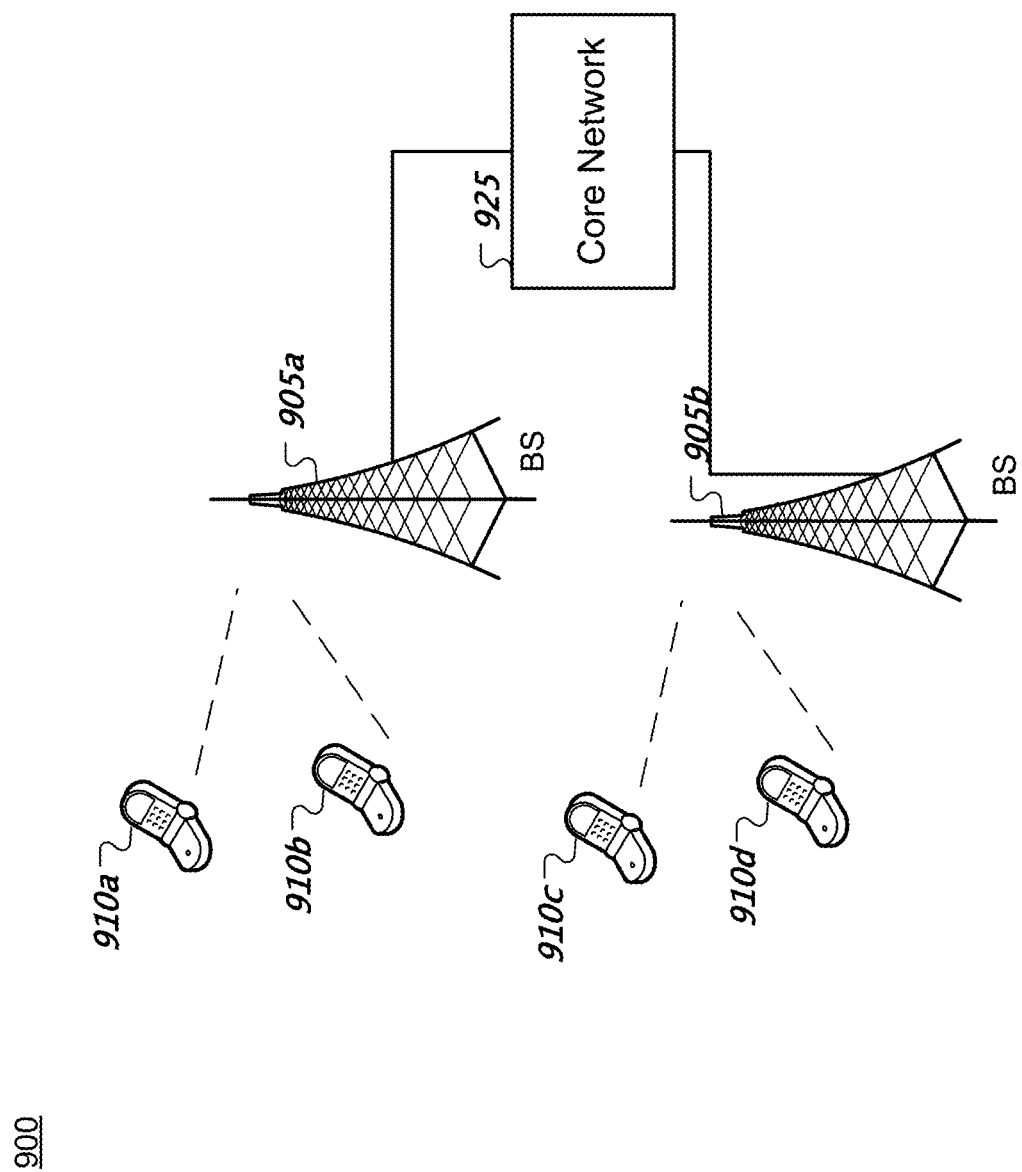
FIG. 9 shows an example of a wireless communication system where techniques in accordance with one or more embodiments of the present technology can be applied.

FIG. 9 shows an example of a wireless communication system where techniques in accordance with one or more embodiments of the present technology can be applied. A wireless communication system 900 can include one or more base stations (BSs) 905a, 905b, one or more wireless devices 910a, 910b, 910c, 910d, and a core network 925. A base station 905a, 905b can provide wireless service to wireless devices 910a, 910b, 910c and 910d in one or more wireless sectors. In some implementations, a base station 905a, 905b includes directional antennas to produce two or more directional beams to provide wireless coverage in different sectors.

The core network 925 can communicate with one or more base stations 905a, 905b. The core network 925 provides connectivity with other wireless communication systems and wired communication systems. The core network may include one or more service subscription databases to store information related to the subscribed wireless devices 910a, 910b, 910c, and 910d. A first base station 905a can provide wireless service based on a first radio access technology, whereas a second base station 905b can provide wireless service based on a second radio access technology. The base stations 905a and 905b may be co-located or may be separately installed in the field according to the deployment scenario. The wireless devices 910a, 910b, 910c, and 910d can support multiple different radio access technologies.

In some implementations, a wireless communication system can include multiple networks using different wireless technologies. A dual-mode or multi-mode wireless device includes two or more wireless technologies that could be used to connect to different wireless networks.

Figure 10:
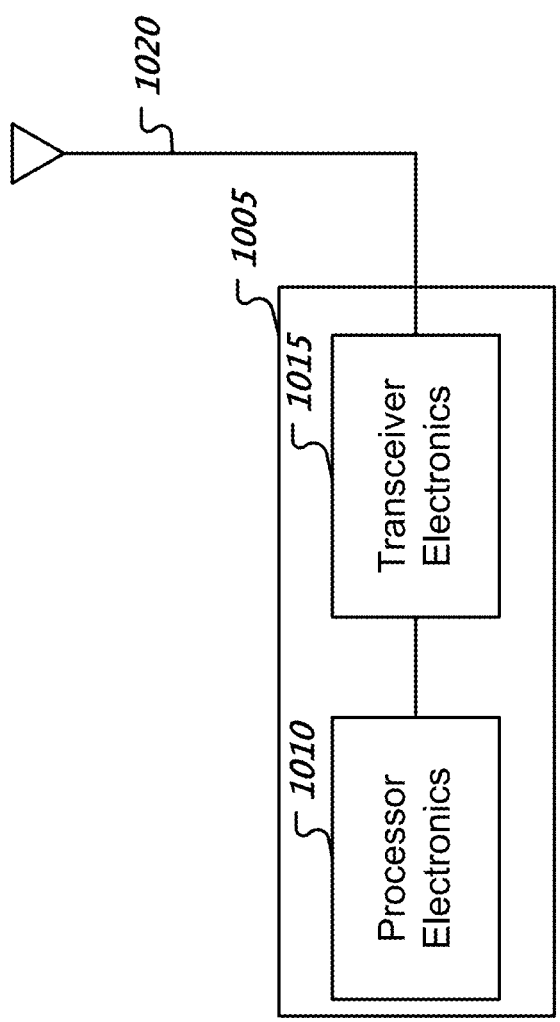
FIG. 10 is a block diagram representation of a portion of a radio station.

FIG. 10 is a block diagram representation of a portion of a radio station. A radio station 1005 such as a base station or a wireless device (or UE) can include processor electronics 810 such as a microprocessor that implements one or more of the wireless techniques presented in this document. The radio station 1005 can include transceiver electronics 1015 to send and/or receive wireless signals over one or more communication interfaces such as antenna 1020. The radio station 1005 can include other communication interfaces for transmitting and receiving data. Radio station 1005 can include one or more memories (not explicitly shown) configured to store information such as data and/or instructions. In some implementations, the processor electronics 1010 can include at least a portion of the transceiver electronics 1015. In some embodiments, at least some of the disclosed techniques, modules or functions are implemented using the radio station 1005.

It is thus evident that non-orthogonal spreading codes can be used to obtain a larger pool of reference signals. The larger pool of reference signals can be leveraged to carry control information in pre-configured transmissions. The larger pool also reduces the probability of data collisions in grant-free transmissions, thereby increasing resource efficiency for IoT scenarios.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for wireless communication, comprising:
receiving, at a mobile device, a message indicating a set of control options available to the mobile device for data transmissions;
selecting a spreading code sequence from a number of spreading code sequences, wherein the spreading code sequence corresponds to a control option in the set of control options, wherein the number of spreading code sequences is greater than a length of each of the spreading code sequence, and wherein the spreading code sequences are generated using a first method due to the length of each of the spreading code sequences is greater than or equal to a value;
generating a plurality of reference signal symbols using the spreading code sequence; and
transmitting, from the mobile device, the plurality of reference signal symbols.

2. The method of claim 1, wherein the first method includes generating the spreading code sequences using a Fourier Transform matrix of dimension N and a permutation of ones and zeros that includes $M=1+C_N^1+C_N^2+\ldots+C_N^{N-2}$ vectors, each vector having a length of N, and wherein the spreading code sequences are generated using a second method different from the first method due to the length of each of the spreading code sequence is less than the value, wherein the second method includes generating the spreading code sequences by combining 1 and a set of primitive Nth roots of unity, N being in a range from 1 to the number of spreading code sequences.

3. A method for wireless communication, comprising:
receiving, at a mobile device, a message indicating one or more parameters and a number of spreading code sequences for data transmissions, wherein the spreading code sequences are generated using a first method due to the length of each of the spreading code sequences being greater than or equal to a value;
generating a reference signal sequence using the one or more parameters and a spreading code sequence from the spreading code sequences, wherein the number of spreading code sequences is greater than the length of each of the spreading code sequence; and
transmitting, from the mobile device, the reference signal sequence.

4. The method of claim 3, wherein the first method includes generating the spreading code sequences using a Fourier Transform matrix of dimension N and a permutation of ones and zeros that includes $M=1+C_N^1+C_N^2+\ldots+C_N^{N-2}$ vectors, each vector having a length of N, wherein the spreading code sequences are generated using a second method different from the first method due to the length of each of the spreading code sequence being less than the value, wherein the second method includes generating the spreading code sequences by combining 1 and a set of primitive Nth roots of unity, N being in a range from 1 to the number of spreading code sequences.

5. The method of claim 3, wherein the one or more parameters indicate a number of Zadoff-Chu roots or a number of cyclic shifts or a legacy reference signal sequence.

6. A method for wireless communication, comprising:
transmitting, to a mobile device, a message indicating a set of control options available to the mobile device for data transmissions; and
receiving, from the mobile device, a plurality of reference signal symbols,
wherein the plurality of reference signal symbols is generated using a spreading code sequence selected from a number of spreading code sequences, wherein the spreading code sequence corresponds to a control option in the set of control options, wherein the number of spreading code sequences is greater than a length of each of the spreading code sequence, and wherein the spreading code sequences are generated using a first method when the length of each of the spreading code sequences is greater than or equal to a value.

7. The method of claim 6, wherein the first method includes generating the spreading code sequences using a Fourier Transform matrix of dimension N and a permutation of ones and zeros that includes $M=1+C_N^1+C_N^2+\ldots+C_N^{N-2}$ vectors, each vector having a length of N, wherein the spreading code sequences are generated using a second method different from the first method when the length of each of the spreading code sequence is less than the value, wherein the second method includes generating the spreading code sequences by combining 1 and a set of primitive Nth roots of unity, N being in a range from 1 to the number of spreading code sequences.

8. A method for wireless communication, comprising:
transmitting, to a mobile device, a message indicating one or more parameters and a number of spreading code sequences for data transmissions, wherein the spreading code sequences are generated using a first method when the length of each of the spreading code sequences is greater than or equal to a value; and
receiving, from the mobile device, a reference signal sequence, wherein the reference signal sequence is generated using the one or more parameters and a spreading code sequence from the spreading code sequences, and wherein the number of spreading code sequences is greater than the length of each of the spreading code sequence.

9. The method of claim 8, wherein the first method includes generating the spreading code sequences using a Fourier Transform matrix of dimension N and a permutation of ones and zeros that includes $M=1+C_N^1+C_N^2+\ldots+C_N^{N-2}$ vectors, each vector having a length of N, wherein the spreading code sequences are generated using a second method different from the first method when the length of each of the spreading code sequence is less than the value, wherein the second method includes generating the spreading code sequences by combining 1 and a set of primitive Nth roots of unity, N being in a range from 1 to the number of spreading code sequences.

10. The method of claim 8, wherein the one or more parameters indicate a number of Zadoff-Chu roots or a number of cyclic shifts or a legacy reference signal sequence.

11. An apparatus for wireless communication comprising:
a processor; and
a memory including processor executable code, wherein the processor executable code upon execution by the processor configures the processor to:
receive a message indicating a set of control options available to the mobile device for data transmissions;
select a spreading code sequence from a number of spreading code sequences, wherein the spreading code sequence corresponds to a control option in the set of control options, wherein the number of spreading code sequences is greater than a length of each of the spreading code sequence, and wherein the spreading code sequences are generated using a first method due to the length of each of the spreading code sequences being greater than or equal to a value;
generate a plurality of reference signal symbols using the spreading code sequence; and
transmit the plurality of reference signal symbols.

12. The apparatus of claim 11, wherein the first method includes generating the spreading code sequences using a Fourier Transform matrix of dimension N and a permutation of ones and zeros that includes $M=1+C_N^1+C_N^2+\ldots+C_N^{N-2}$ vectors, each vector having a length of N, and wherein the spreading code sequences are generated using a second method different from the first method due to the length of each of the spreading code sequence being less than the value, wherein the second method includes generating the spreading code sequences by combining 1 and a set of primitive Nth roots of unity, N being in a range from 1 to the number of spreading code sequences.

13. An apparatus for wireless communication comprising:
a processor; and
a memory including processor executable code, wherein the processor executable code upon execution by the processor configures the processor to:
receive a message indicating one or more parameters and a number of spreading code sequences for data transmissions, wherein the spreading code sequences are generated using a first method due to the length of each of the spreading code sequences being greater than or equal to a value;
generate a reference signal sequence using the one or more parameters and a spreading code sequence from the spreading code sequences, wherein the number of spreading code sequences is greater than the length of each of the spreading code sequence; and
transmit the reference signal sequence.

14. The apparatus of claim 13, wherein the first method includes generating the spreading code sequences using a Fourier Transform matrix of dimension N and a permutation of ones and zeros that includes $M=1+C_N^1+C_N^2+\ldots+C_N^{N-2}$ vectors, each vector having a length of N, wherein the spreading code sequences are generated using a second method different from the first method due to the length of each of the spreading code sequence being less than the value, wherein the second method includes generating the spreading code sequences by combining 1 and a set of primitive Nth roots of unity, N being in a range from 1 to the number of spreading code sequences.

15. The apparatus of claim 13, wherein the one or more parameters indicate a number of Zadoff-Chu roots or a number of cyclic shifts or a legacy reference signal sequence.

16. An apparatus for wireless communication comprising:
a processor; and
a memory including processor executable code, wherein the processor executable code upon execution by the processor configures the processor to:
transmit a message indicating a set of control options available to the mobile device for data transmissions; and
receive a plurality of reference signal symbols,
wherein the plurality of reference signal symbols is generated using a spreading code sequence selected from a number of spreading code sequences, wherein the spreading code sequence corresponds to a control option in the set of control options, wherein the number of spreading code sequences is greater than a length of each of the spreading code sequence, and wherein the spreading code sequences are generated using a first method when the length of each of the spreading code sequences is greater than or equal to a value.

17. The apparatus of claim 16, wherein the first method includes generating the spreading code sequences using a Fourier Transform matrix of dimension N and a permutation of ones and zeros that includes $M=1+C_N^1+C_N^2+\ldots+C_N^{N-2}$ vectors, each vector having a length of N, wherein the spreading code sequences are generated using a second method different from the first method when the length of each of the spreading code sequence is less than the value, wherein the second method includes generating the spreading code sequences by combining 1 and a set of primitive Nth roots of unity, N being in a range from 1 to the number of spreading code sequences.

18. An apparatus for wireless communication comprising:
a processor; and
a memory including processor executable code, wherein the processor executable code upon execution by the processor configures the processor to:
transmit a message indicating one or more parameters and a number of spreading code sequences for data transmissions, wherein the spreading code sequences are generated using a first method when the length of each of the spreading code sequences is greater than or equal to a value; and
receive a reference signal sequence, wherein the reference signal sequence is generated using the one or more parameters and a spreading code sequence from the spreading code sequences, and wherein the number of spreading code sequences is greater than the length of each of the spreading code sequence.

19. The apparatus of claim 18, wherein the first method includes generating the spreading code sequences using a Fourier Transform matrix of dimension N and a permutation of ones and zeros that includes $M=1+C_N^1+C_N^2+\ldots+C_N^{N-2}$ vectors, each vector having a length of N, wherein the spreading code sequences are generated using a second method different from the first method when the length of each of the spreading code sequence is less than the value, wherein the second method includes generating the spreading code sequences by combining 1 and a set of primitive Nth roots of unity, N being in a range from 1 to the number of spreading code sequences.

20. The apparatus of claim 18, wherein the one or more parameters indicate a number of Zadoff-Chu roots or a number of cyclic shifts or a legacy reference signal sequence.

* * * * *

UNITED STATES PATENT AND TRADEMARK OFFICE
CERTIFICATE OF CORRECTION

PATENT NO. : 11,171,734 B2
APPLICATION NO. : 16/908609
DATED : November 9, 2021
INVENTOR(S) : Wei Cao et al.

Page 1 of 1

It is certified that error appears in the above-identified patent and that said Letters Patent is hereby corrected as shown below:

In the Specification

In Column 2, Line 1, delete "(HARM)" and insert -- (HARQ) --, therefor.

In Column 3, Line 14, delete "(HARM)" and insert -- (HARQ) --, therefor.

In Column 4, Line 33, delete "(BS)" and insert -- (BSs) --, therefor.

In Column 4, Line 48, delete "amount" and insert -- amount of --, therefor.

In Column 4, Line 51, delete "1-3" and insert -- 1~3 --, therefor.

In Column 5, Line 24, delete "B S" and insert -- BS --, therefor.

In Column 5, Line 41, delete "(RACH)." and insert -- (RACHs). --, therefor.

In Column 7, Line 53, delete "(MCS)," and insert -- (MCSs), --, therefor.

In Column 9, Table 1, Line 7, delete "[1-i]" and insert -- [1-j] --, therefor.

In Column 10, Table 3, Line 4, delete "[1 i]" and insert -- [1 1] --, therefor.

In Column 11, Line 2, delete "the" and insert -- of the --, therefor.

In Column 14, Line 1, delete "more" and insert -- more of --, therefor.

In Column 14, Line 43, delete "read only" and insert -- read-only --, therefor.

In Column 14, Line 57-58, delete "CD ROM" and insert -- CD-ROM --, therefor.

Signed and Sealed this
Eighteenth Day of January, 2022

Drew Hirshfeld
*Performing the Functions and Duties of the*
*Under Secretary of Commerce for Intellectual Property and*
*Director of the United States Patent and Trademark Office*